United States Patent [19]

Pasco et al.

[11] 4,191,721

[45] Mar. 4, 1980

[54] MAKING CERAMIC ARTICLES HAVING A HIGH DEGREE OF POROSITY AND CRUSHABILITY CHARACTERISTICS

[75] Inventors: Wayne D. Pasco, Ballston Lake; Frederic J. Klug, Amsterdam; Svante Prochazka, Ballston Lake, all of N.Y.

[73] Assignee: General Electric Company, Schenectady, N.Y.

[21] Appl. No.: 839,994

[22] Filed: Oct. 6, 1977

[51] Int. Cl.$^2$ ............................................. B29H 7/20
[52] U.S. Cl. ...................................... 264/43; 106/38.9; 106/40 R; 106/41; 106/62; 106/65; 106/73.2; 106/73.4; 164/41; 164/132; 164/369; 264/44; 264/45.5; 264/65; 264/66
[58] Field of Search ................... 106/40 R, 41, 65, 62, 106/38.9, 73.2, 73.4; 264/43, 65, 66; 164/132, 369, 41

[56] References Cited

U.S. PATENT DOCUMENTS

| 2,593,507 | 4/1952 | Wainer | 106/41 X |
| 3,538,202 | 11/1970 | Bidard | 106/41 X |
| 3,903,225 | 9/1975 | Jones et al. | 106/65 |
| 3,969,124 | 7/1976 | Stewart | 106/65 |
| 4,013,477 | 3/1977 | Jatkar et al. | 106/65 |
| 4,031,177 | 6/1977 | Auriol et al. | 106/65 |
| 4,073,662 | 2/1978 | Borom | 106/62 |

OTHER PUBLICATIONS

Gitzen, W. H., "Alumina as a Ceramic Material"—pub. (1970) by Am. Cer. Soc., pp. 27–28, 30, 36–38, 104–105, 130–131.

*Primary Examiner*—Helen M. McCarthy
*Attorney, Agent, or Firm*—Donald M. Winegar; Joseph T. Cohen; Leo I. MaLossi

[57] ABSTRACT

A method for increasing the porosity and crushability characteristics thereof embodies the firing of a ceramic compact comprising a reactant fugitive filler material and a ceramic material in a controlled atmosphere.

12 Claims, 6 Drawing Figures

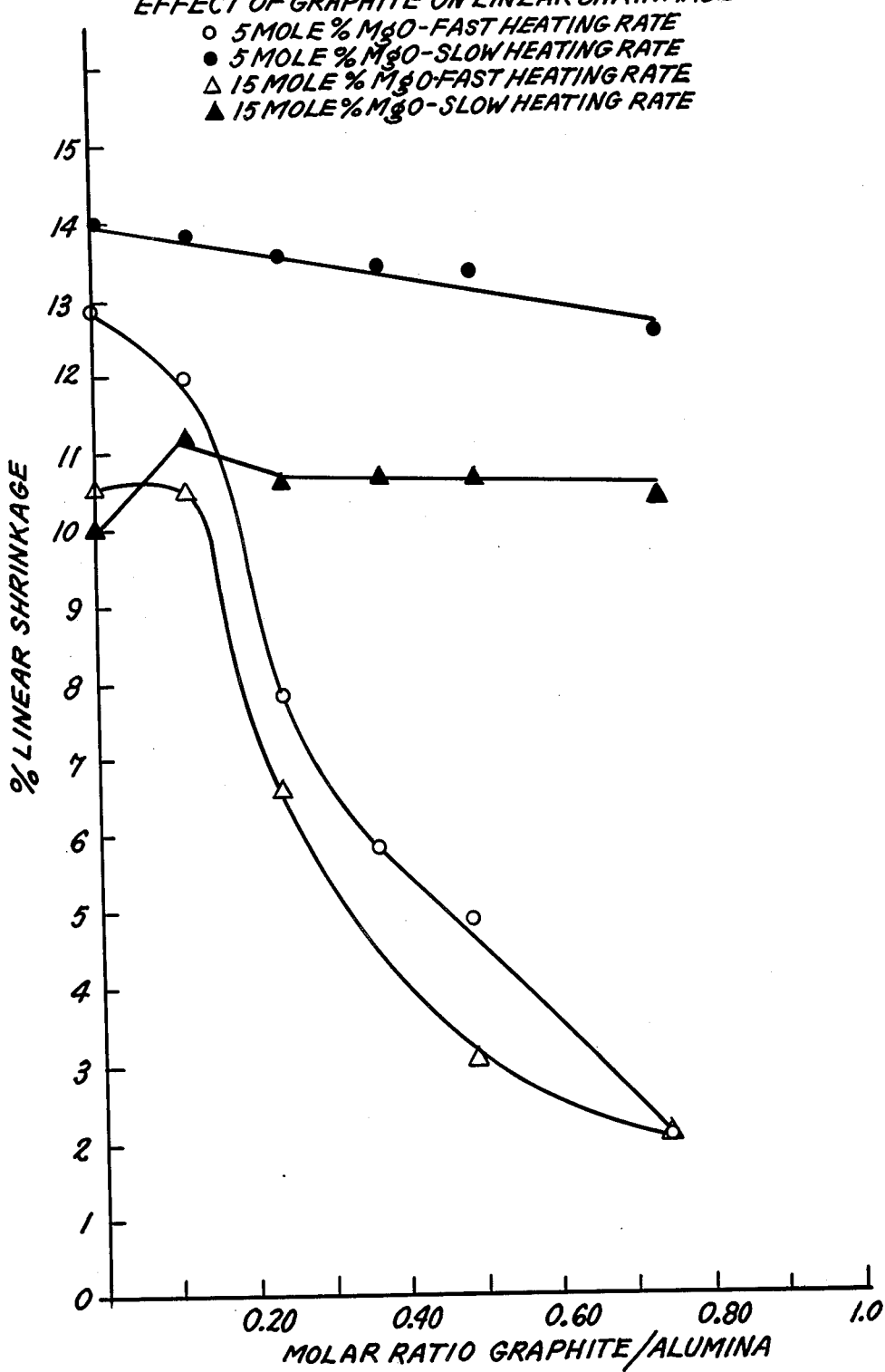

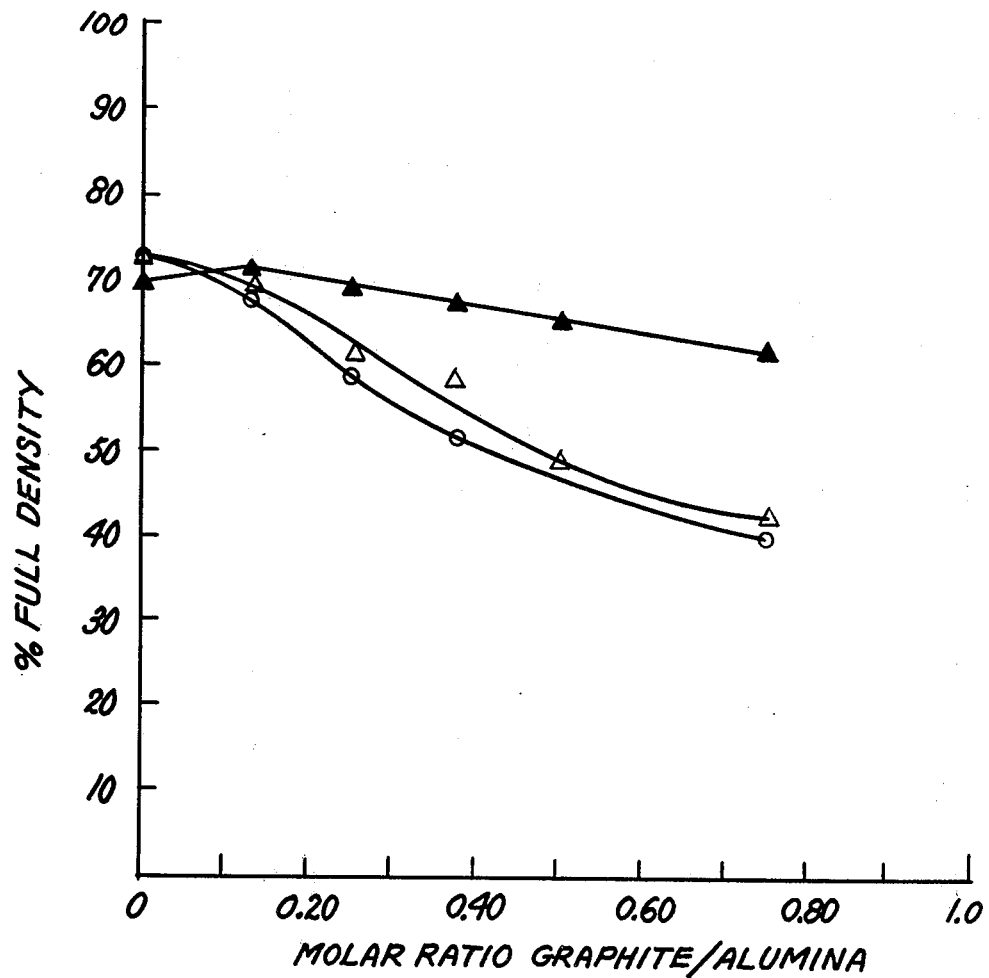

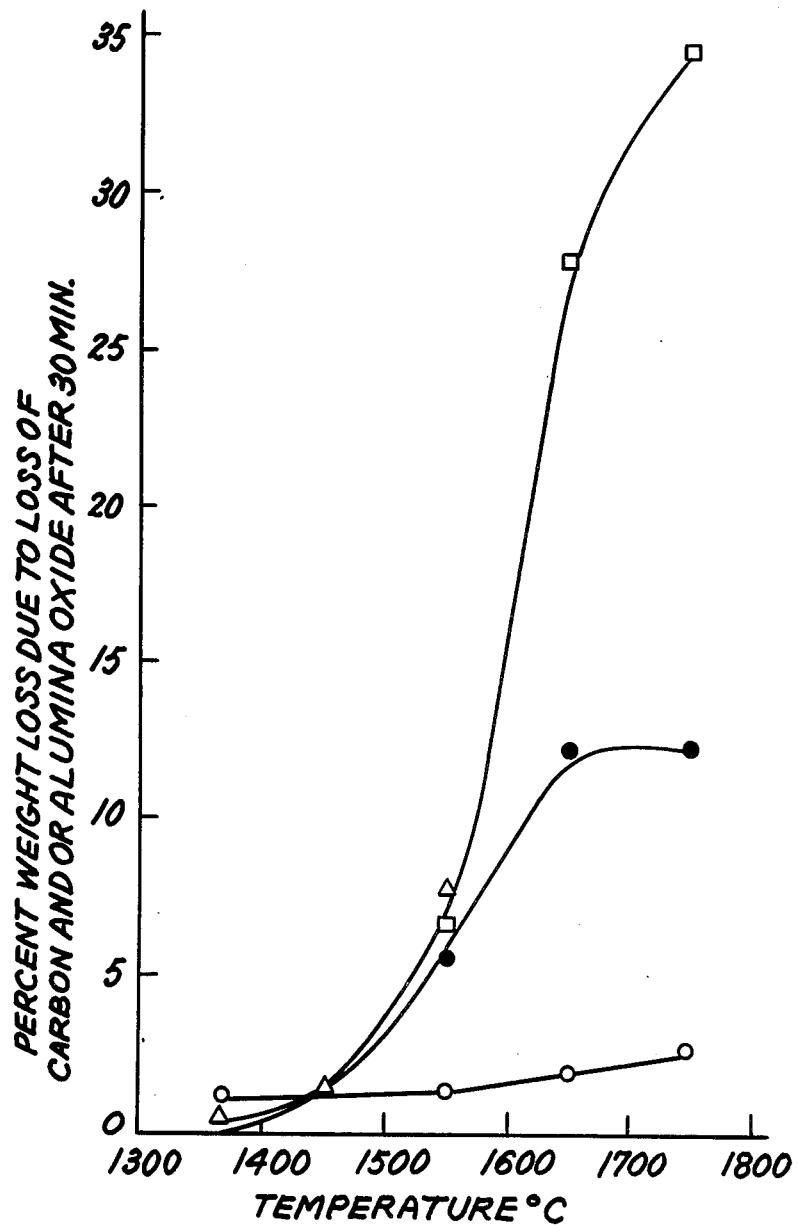

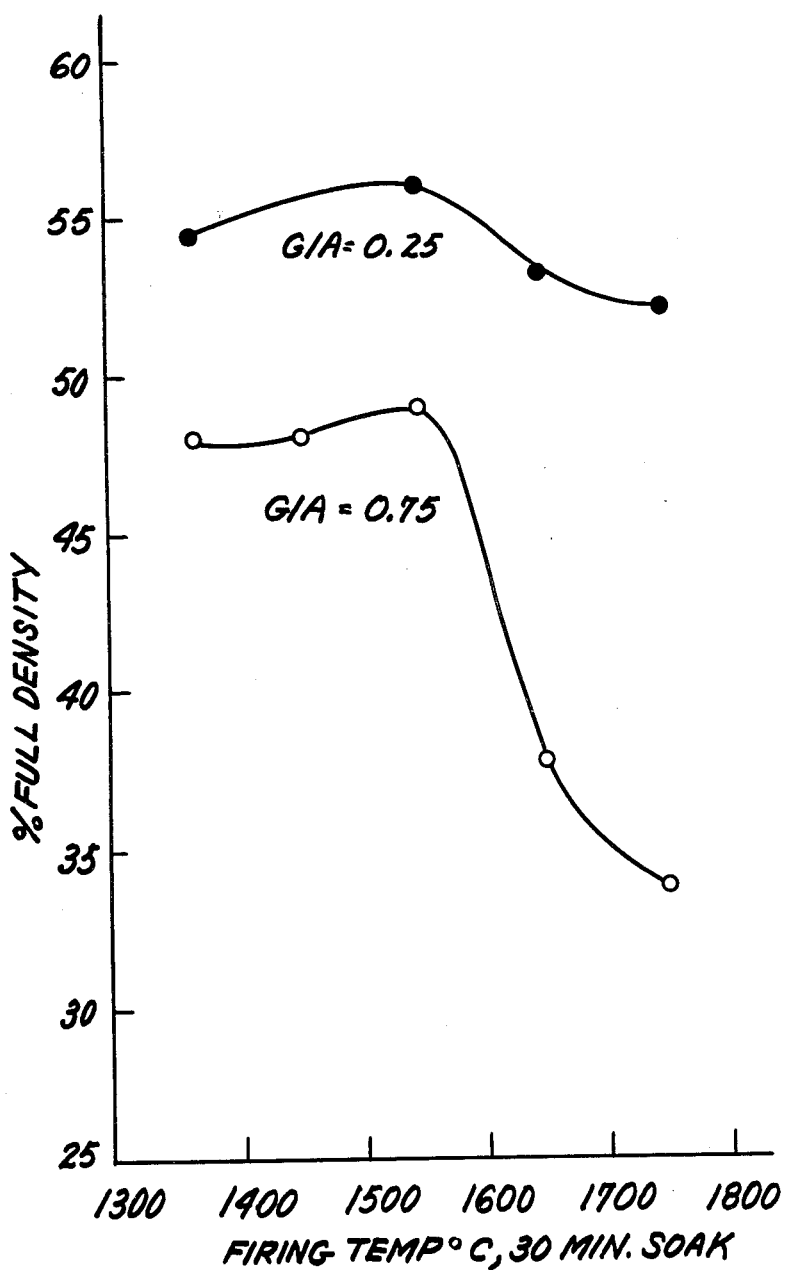

MAKING CERAMIC ARTICLES HAVING A HIGH DEGREE OF POROSITY AND CRUSHABILITY CHARACTERISTICS

RIGHTS GRANTED TO THE UNITED STATES OF AMERICA

The Government of the United States of America has rights in this invention pursuant to Contract No. F33615-76-C-5110 awarded by the Department of the Air Force.

BACKGROUND OF THE INVENTION

1. Field of the Invention

This invention relates to improvements in investment casting and to an improved method for making alumina cores for employment therewith.

2. Description of the Prior Art

The production of directionally solidified (DS) metal eutectic alloys and superalloys for high pressure turbine (HPT) airfoils with intricate internal passageways for air cooling requires that the core and mold not only be dimensionally stable and sufficiently strong to contain and shape the casting but also be sufficiently weak to prevent mechanical rupture (hot cracking) of the casting during solidification and cooling. The DS process requirements of up to 1875° C. for a 16 hr. time period imposes severe constraints on materials which may serve as mold or core candidates.

The prior art appears to be mostly limited to the use of silica or silica-zircon core and mold materials. At temperatures greater than 1600° C. the silica based materials fail from the standpoint of both mechanical integrity and chemical incompatibility with the advanced alloy compositions.

Dimensional control of the silica core is excellent since cristobalite exhibits very little densification. Microstructural examination reveals that, in some cases, commercial core compositions employ very large particles ($>100$ $\mu$m). The addition of large particles serves to lower both shrinkage and mechanical strength.

Paul S. Svec in "Process For Making an Investment Mold For Casting And Solidification of Superalloys Therein," Ser. No. 590,970, now U.S. Pat. No. 4,024,300, teaches the use of alumina-silica compositions for making molds and cores. Charles D. Greskovich and Michael F. X. Gigliotti, Jr. in U.S. Pat. Nos. 3,955,616 and 3,972,367 teach cores and molds of alumina-silica compositions which have a barrier layer of alumina formed at the mold/metal interface. One possible means for the formation of their alumina layer is by a chemical reaction wherein carbon of the susceptor chemically reduces the material composition of the mold or core. Charles D. Greskovich in U.S. Pat. No. 4,026,344 also teaches an alumina-silica composition wherein the material is of a predetermined size so as to favor, and therefore enable, the formation of metastable mullite for molds and cores which exhibit superior sag resistance at high temperatures.

Aluminum oxide by itself, without a chemical or physical binder material, has been identified as a potential core and mold material based on both chemical compatibility and leachability considerations. There is, however, a considerable thermal expansion mismatch between the ceramic and the alloy which generates, around the ceramic core, hoop and longitudinal tensile stresses in the alloy on cooling from the DS temperature. The high elastic modulus and high resistance to deformation at elevated temperatures of dense alumina and its lower coefficient of thermal expansion than the alloy result in the mechanical rupture or hot tearing of the alloy.

A mechanism by which an alumina core body can deform under the strain induced by the cooling alloy must be developed to permit the production of sound castings. The microstructure of the ceramic core and mold must be tailored to permit deformation under isostatic compression at a stress low enough to prevent hot tearing or cracking of the alloy. The surface of the core and mold must also serve as a barrier to metal penetration.

The material composition of the core is not only determined by the casting conditions to be encountered but also by the method of manufacturing the core and the method of removal of the core from the casting.

Should the shape of the core be a simple configuration, one may be able to make a core by mixing the constituents, pressing the mix into a predetermined shape and sintering the shape for strength for handling.

The production of a core such as required for the intricate internal cooling passages of a high pressure turbine airfoil or blade necessitates the use of a process such as injection or transfer molding. In injection molding, the molding compound must be capable of injection in a complex die in a very short time with complete die filling. Furthermore, the molding compound must flow readily without requiring excessive pressure which could result in die separation and extrusion of material out through the seams. Excessive pressure must also be avoided to prevent segregation of the liquid binder and the solids. A sufficient amount of a plasticizing vehicle will accomplish these requirements. However, a primary requirement of an injection molding compound is that the volume fraction of solids in the body must be greater than 50% at the injection temperature. Should the solids loading be less than 50% by volume, the solids may become a discontinuous phase. Upon removal of the plasticizing material from the core, the lack of particle contact may result in deformation of the core specimen. High porosity and, therefore, low density structures in the sintered core specimen are required to minimize its compressive strength.

An object of this invention is to provide a new and improved material composition embodying a reactant fugitive filler material for making cores for casting directionally solidified eutectic and superalloy materials.

Another object of this invention is to provide a new and improved material composition for making cores and casting directionally solidified eutectic and superalloy materials wherein carbon as a reactant fugitive filler is employed to increase the porosity and crushability characteristics of ceramic articles made therefrom.

A further object of this invention is to provide a reactant fugitive filler which is a primary source of carbon or other suitable reactant material at an elevated temperature to chemically reduce alumina in a new and improved material composition for cores and to produce porosity within the core.

A still further object of this invention is to provide a new and improved method for making a core for investment casting with an improved porosity content and improved crushability characteristics.

Other objects of this invention will, in part, be obvious and will, in part, appear hereinafter.

BRIEF DESCRIPTION OF THE INVENTION

In accordance with the teachings of this invention there is provided a new and improved method for making fired ceramic articles suitable for use in the investment casting of directionally solidified eutectic and superalloy materials. The method includes preparing a material composition comprising an organic binder, a reactant fugitive filler material and an alumina flour which is one selected from the group consisting of alumina and magnesia doped alumina. Thereafter a portion of the material composition is worked into a preform of a predetermined shape. The organic binder is then removed from the preform by suitable means. The preform is then fired to cause a reaction between the alumina and the reactant fugitive filler material to provide at least one or more suboxides of alumina which are caused to be evolved from the fired preform by a vapor transport action thereby resulting in a ceramic article having a predetermined porosity content and enhanced crushability characteristics.

DESCRIPTION OF THE DRAWINGS

FIG. 3 is a plot showing the effect of graphite additions on the linear shrinkage of a fired alumina compact.

FIG. 4 is a plot showing the effect of graphite additions on the density of a fired alumina compact.

FIG. 5 is a plot showing the weight loss due to the reaction between graphite and alumina in a fired compact.

FIG. 6 is a plot showing the effect of graphite on the density of a fired compact.

DESCRIPTION OF THE INVENTION

Figure 1:
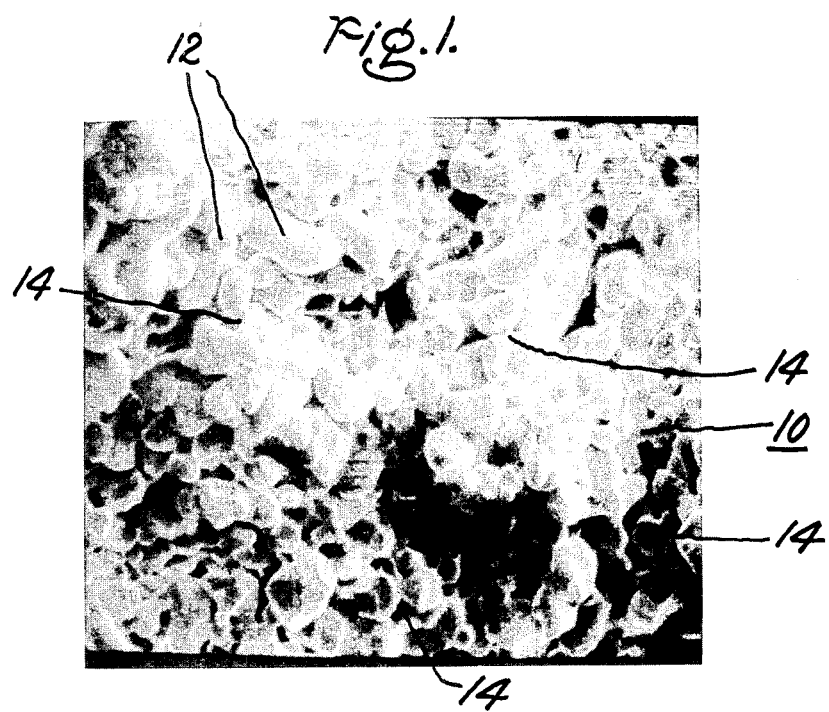
FIG. 1 is a photomicrograph showing the morphology of the alumina grain structure of a fired compact at 500×.

With reference to FIG. 1 there is shown the microstructure of fired ceramic compact 10 made of alumina. The microstructure shows that the porosity is continuous throughout the compact 10 and that the grain morphology is characteristic of grains 12 which have undergone vapor phase transport action. The vapor transport action involves the evaporation and/or formation of a gaseous suboxide of a portion of material of one grain at high surface energy regions of the grain and the transportation of the material to low surface energy regions of the grain, where it condenses or is oxidized. By this action the grains 12 become coarse and rounded. Additionally, aluminum suboxide gaseous species are transported out of the compact 10 whereby the compact 10 registers a net weight loss. The vapor transport action results in a network of narrow connecting bridges 14 between the alumina particles or grains 12.

The compact 10 is suitable for use as a core in investment casting of directionally solidified eutectic and superalloy materials. It is desirable for the cooling passages of the turbine blade to have a complex configuration. Therefore, it is necessary for the compact or core to have a complex shape. The preferred method of forming the compact or core 10 in an unfired state is by injection or transfer molding. The preferred material for the compact or core 10 is alumina or magnesia doped alumina because casting temperatures are in excess of 1600° C. and as high as 1850° C. while directional solidification times are in excess of 16 hours.

Figure 2:
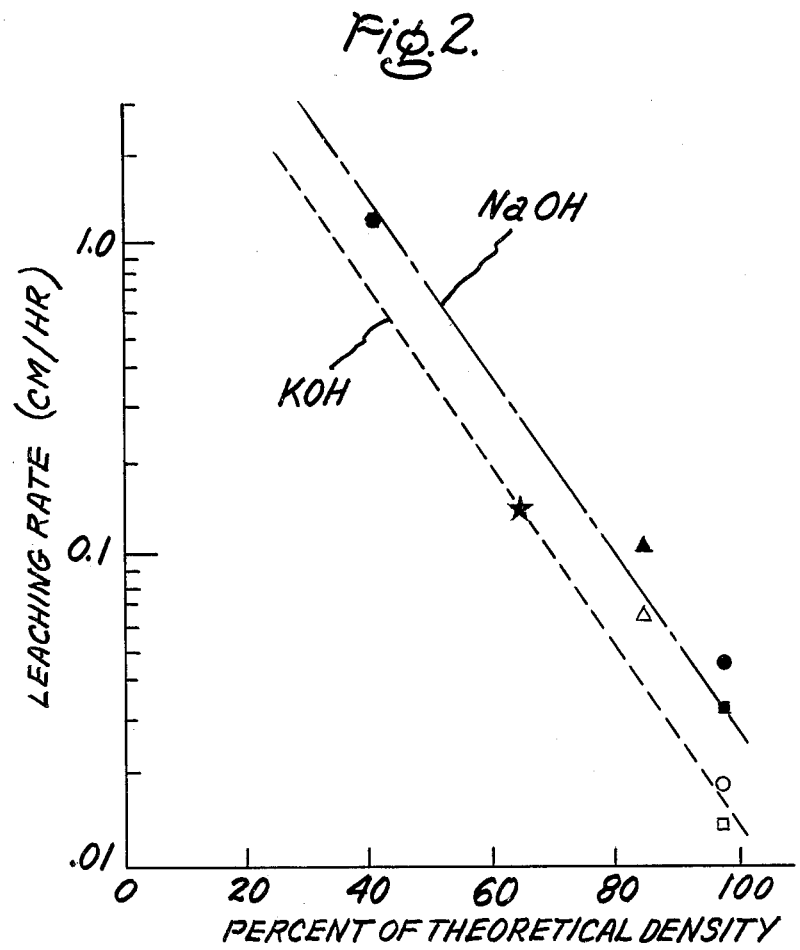
FIG. 2 is a plot of Log of the leaching rate versus theoretical density of a fired alumina compact.

The alumina compact 10 is easily removed from the casting by leaching in a KOH or NaOH solution in an autoclave. The leaching rate, however, is dependent upon the porosity of the compact 10. As shown in FIG. 2, if one can manufacture a compact 10 with a porosity content of from 60 percent to 70 percent by volume, a very significant increase in the leaching rate of the compact 10 can be obtained. Additionally, the compact 10 would make an acceptable core for making turbine blades wherein the wall thickness is about 0.060 inch or less since it will have good crushability characteristics.

In injection molding, the solids content of the material composition employed to form a compact to function as a core, and having a complex shape, initially must be in excess of 50 percent by volume to prevent the solids included therein from becoming a discontinuous phase, upon binder removal and before sintering occurs. Should the solid material become a discontinuous phase the compact may deform or disintegrate because of insufficient green strength.

To increase porosity in the fired compact a reactant fugitive filler material is desirable. The reactant fugitive filler material provides, along with the alumina material, the total solids content necessary for injection molding. Upon a subsequent firing at an elevated temperature, the reactant fugitive filler is "burned" off in a suitable manner to increase the porosity content of the compact 10. A desirable reactant fugitive filler material is one which will also react with the alumina to eliminate or remove a portion thereof from the compact 10 and thereby increase the porosity content further. Suitable fugitive filler materials are those which will provide enough reactant material at the elevated temperature to reduce a portion of the alumina which, in part, is removed from the compact in the gaseous state and which, in part, is deposited on other alumina grains by vapor phase transport action causing a coarsening and a rounding thereof. Preferred reactant bearing materials are graphite, aluminum, aluminum carbide, aluminum oxycarbide, boron and boron carbide. Suitable organic materials may also be employed as reactant materials as a carbon source.

The particle size of the alumina is important. It is desirable that the size of the pores in the compact, particularly at the outside surfaces which contact the cast metal, be small enough to prevent any significant metal penetration. It is desirable that metal penetration of the compact surface be minimized in order to obtain the best surface possible for the casting.

The particle size distribution of the alumina has a significant effect on the rheology of the wax-carbonalumina systems. The alumina or magnesia doped alumina and the carbon bearing material have a particle size range of less than about 300 microns. The preferred particle size is from 1 micron to 50 microns.

ALUMINA POWDERS

Suitable alumina material is obtainable as fused alumina powder from the Norton Company and as aggregate free alumina powder from the Meller Company. Suitable alumina powders are (a) Norton-400 Alundum wherein the particle size distribution is typically as follows:

| Particle Size | Weight percentage |
|---|---|
| 0–5µ | 15% |
| 5µ–10µ | 13% |

-continued

| Particle Size | Weight percentage |
|---|---|
| 10μ–20μ | 64% |
| 20μ–30μ | 7% |
| >30 | 1% |

(b) Norton-320 Alundum wherein the particle size distribution is typically as follows:

| Particle Size | Weight percentage |
|---|---|
| 0–10μ | 3% |
| 10μ–20μ | 53% |
| 20μ–30μ | 36% |
| 30μ–37μ | 7% |
| >37μ | 1% |

(c) Norton-38-900 Alundum wherein the particle size distribution is typically as follows:

| Particle Size | Weight percentage |
|---|---|
| 0–5 | 55.5 |
| 5μ–10μ | 34.0 |
| >10μ | remainder |

(d) Meller 0.3μ aggregate free alumina.

Various possible ceramic mixtures include 80 weight percent Norton-400, balance Meller 0.3μ; 70 weight percent Norton-400, balance Meller 0.3μ; 100 weight percent Norton-320; 80 weight percent Norton-320, balance Norton 38-900, and 100 weight percent Norton 38-900.

Alumina doped with at least 1 mole percent magnesia is also suitable as a ceramic material for making the compact 10. It is believed that the addition of the divalent alkaline earth cations into the trivalent cation lattice of $Al_2O_3$ introduces lattice defects which enhance the kinetics of the dissolution of alumina during autoclave caustic leaching.

The magnesia may be present in amounts of from about 1 mole percent up to about 30 mole percent. It has been discovered that as the magnesia content decreases, the volume fraction of the magnesia doped alumina phase increases. The magnesia doped alumina phase encases the spinel phase. The spinel phase therefore provides either an interconnected network defining a plurality of interstices in which the magnesia doped phase is found or a dispersion of particles within a matrix of magnesia doped alumina.

Above about 20 mole percent magnesia, the magnesia doped alumina network begins to become discontinuous. Dissolution of the alumina network by autoclave KOH or NaOH processing therefore begins to require an excessive increase in processing time. The decrease in dissolution is attributed to the fact that autoclave leaching must occur by intergranular attack which at a magnesia content of about 25 mole percent is almost an order of magnitude slower than at 20 mole percent content.

Two methods of fabricating compacts with magnesia doped alumina may be employed. In one instance a mechanical mix of alumina powder of the desired particle size content and the appropriate amount of magnesia is prepared. This mechanical mixture is then added to the melted wax in the process to be described later.

In the second instance, the same mechanical mixture is prepared and calcined at a temperature of 1500° C.±200° C. for about 1 to 4 hours to form a two phase product of spinel and magnesia doped alumina. The calcined product is then crushed and ground to a particle size of from 1 μm to 40 μm. This mechanical mixture is then added to the melted wax in the process to be described later.

One or more waxes can be employed to provide adequate deflocculation, stability and flow characteristics. The plasticizing vehicle system preferably consists of one or more paraffin type waxes which form the base material. A purified mineral wax ceresin may also be included in the base material. To 100 parts of the base wax material additions of oleic acid, which acts as a deflocculent and aluminum stearate, which acts to increase the viscosity of the base wax, are added. A preferred plasticizing vehicle has the following composition:

| Binder: | Material | Part By Weight | | |
|---|---|---|---|---|
| | P-21 paraffin (Fisher Scientific) | 33⅓ | | |
| | P-22 paraffin (Fisher Scientific) | 33⅓ | | |
| | Ceresin (Fisher Scientific) | 33⅓ | | |
| | Total | 100 parts | | |
| | | Part By Weight | | |
| Additives: | Material | Range | Preferred | Typical |
| | oleic acid | 0–12 | 6–8 | 8 |
| | beeswax, white | 0–12 | 3–5 | 4 |
| | aluminum stearate | 0–12 | 3–6 | 3 |

Despite the addition of defocculent, large particle size, of the order of >50 microns, can settle at a rather rapid rate in the wax and can change the sintering behavior of the remainder of the material mix of the molding composition material. The rate of settling of large particles is adjusted by varying the viscosity of the liquid medium, wax. To this end aluminum stearate is added to the wax to increase viscosity by gelling. Increased viscosity also has the additional benefits of preventing segregation of the wax and solids when pressure is applied and reducing the dilatancy of the material mixture.

In order to describe the invention more fully, and for no other reason, the reactant fugitive filler material is said to be a carbon bearing material. The amount of carbon bearing material added to the core composition mix is dependent upon the porosity desired in the fired core as well as the average particle size of the alumina material. The carbon material present in the core material mix as graphite has a molar ratio of carbon to alumina of from about 0.3 to 1.25. This molar ratio range has been found to provide excellent results. The graphite is retained in the bisque ceramic during heating until after the alumina begins to sinter and develops strength at the alumina-alumina particle contacts. The graphite can now be removed from the structure, or compact, without producing a discontinuous solid phase that could cause distortion of the compact.

The expected chemical reactions between alumina and carbon occur at temperatures greater than 1500° C. in a reducing or inert atmosphere. The result of these reactions is the production of volatile suboxides of alumina. The possible reactions are:

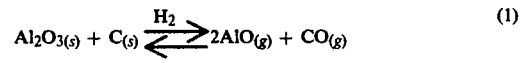

(1)

-continued

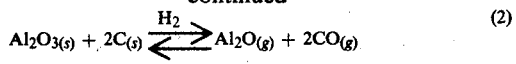
(2)

with (2) being the most probable reaction to occur.

At temperatures above 1500° C., the vapor pressure of the suboxide is significant. As the vapor pressure increases, mass transport by an evaporation-condensation type mechanism can occur. If the rate of mass transport through the vapor phase is much greater than mass transport by volume or grain boundary diffusion, the material is merely rearranged in the compact and no reduction in the pore volume (i.e. densification) can take place. In the reducing or inert atmosphere, the suboxide can escape thereby lowering the density of the compact or fired ceramic and producing the microstructure of the central portion 14 of the compact 10 as illustrated in FIGS. 1 and 2.

The effect of carbon additions, in the form of graphite, on the weight loss of the ceramic article when fired in a reducing atmosphere, such as hydrogen, is a function of the heating rate and the atmosphere above about 900° C.

When the heating rate is less than the order of about 100° C. per hour in the temperature range of from about 900° C. to about 1500° C., with oxygen present as an impurity in the controlled atmosphere, the expected porosity content or the percent decrease in fired density, is not obtained. In fact there is quite a difference noted. Apparently, the carbon reacts with the gaseous oxygen impurity to form gaseous CO and $CO_2$, which escape from the compact. Consequently, insufficient carbon is available above about 1500° C. to reduce the alumina to a gaseous suboxide and produce the fired compact of desired porosity content.

Controlled atmospheres for firing the compacts to obtain the desired chemical reactions in the remaining material may be of a reducing type or of an inert gas type. Hydrogen may be employed as a reducing gas type atmosphere. Argon, helium, neon and the like may be utilized for atmospheres of the inert gas type.

As shown in FIG. 3 the effect of carbon additions on the linear shrinkage of the fired ceramic is dependent upon the molar ratio of carbon to alumina, the amount of oxygen impurity in the atmosphere and the heating rate.

As the molar ratio of carbon to alumina is increased the percent linear shrinkage of the compact is decreased. The molar ratio of carbon to alumina may be inadvertently reduced in the compact during the firing if oxygen impurities in the atmosphere react with a portion of the carbon in the compact to form CO or $CO_2$. In FIG. 3, the effect of the heating rate on the oxidation of carbon is shown. When a slow heating rate is employed, the carbon to alumina ratio is lowered by oxidation of carbon and high shrinkages result. When a fast heating rate is used the carbon to alumina ratio is not greatly affected by oxidation of carbon and low shrinkages result. If the firing atmosphere were completely free of any oxygen or water vapor the resulting linear shrinkage would be independent of the heating rate used and would only be a function of the initial carbon content. For example, when the carbon to alumina ratio is about 0.75, the linear shrinkage is only 2% if a fast heating rate is practiced when the controlled atmosphere includes the presence of oxygen as an impurity therein. In contrast, under the same conditions, with a slow heating rate, a linear shrinkage as high as 13% has been observed. A low shrinkage is desirable in producing the required close dimensional tolerances. The same effects are noted when undoped or pure alumina flour is employed in the core composition mix.

The percent linear shrinkage is also dependent on the grain size of the alumina flour employed. A larger grain size material will decrease the percent linear shrinkage which will occur. Therefore, as stated previously, the grain size of the alumina flour employed in making the fired compact 10 is preferably from about 1 micron to about 50 microns.

Referring now to FIG. 4, the molar ratio of carbon to alumina and of carbon to magnesia doped alumina, affects the density of the fired core. An increasing molar ratio of up to 0.75 results in decreasing the fired density of the ceramic article to about 40 percent of full density from an initial 70 percent of full density when practiced at a fast heating rate with an oxygen impurity present. However, when a slow heating rate is practiced in the presence of oxygen impurity, the percentage of full density for an article embodying a carbon to magnesia doped alumina of from 0 to 0.75 remains at approximately 70 percent.

Although the molar ratio of carbon (with the carbon expressed as graphite) to alumina affects the various physical characteristics of the fired ceramic articles, the rate of heating concomitant with the oxygen partial pressure also has a pronounced effect on the fired articles. Therefore, an improperly fired ceramic article has less porosity, exhibits poorer crushability characteristics, undergoes higher shrinkage, and requires a longer leaching time to remove the ceramic article from the casting.

With reference to FIG. 5, the percent weight loss due to the loss of carbon and/or alumina is dependent upon the firing temperature. Above about 1550° C., the loss becomes appreciable and is related to molar ratio of carbon to alumina. The greater effect is noted with increasing molar ratios of graphite to alumina.

Referring now to FIG. 6, the effect of the molar ratio of graphite to alumina on the fired density of ceramic articles made from the material composition mix of this invention is shown. For molar ratios of 0.25 to 0.75, the fired density increases slightly with increasing temperature up to about 1500° C. Above 1500° C., the higher molar ratio material shows a significant decrease in the fired density of the ceramic article.

Other suitable starting materials may include rare earth doped alumina wherein the alumina is in excess and the reactant fugitive filler material will reduce the excess alumina present. Such materials include yttrium aluminate and lanthanum aluminate.

The composition of this invention when prepared for injection molding may be prepared in several ways. A preferred method embodies the use of a Sigma mixer having a steam jacket for heating the contents. When the plasticizer material is comprised of one or more waxes, the wax is placed in the mixer and heated to a temperature of from 80° C. to 110° C. to melt the wax or waxes. The additive agents of one or more deflocculents and aluminum stearate are then added, as required, in the desired quantities. The mixing is continued for about 15 minutes to assure a good mixture of the ingredients. The desired quantity of reactant fugitive filler material is then added and mixing, at the elevated temperature, is continued until all visible chunks of reactant fugitive filler material are broken up. To this mixture is then added the alumina bearing flour or mixture of flours of the desired size distribution. Mixing is then continued, in vacuum, at the elevated temperature for about 30 minutes or until all constituents are universally distributed throughout the mixture. The heat is turned off and coolant water passed through the steam jacket to cool the mixture. Mixing is continued for a period of from 30 to 40 minutes, or until the mix is pelletized to a desired size of less than 2 cm.

Employing the composition mix of this invention one is able to injection mold complex shaped cores at from 200 psi to 10,000 psi and upwards to 50,000 psi at temperatures of from 80° C. to 130° C. The shrinkage of such composition mix is on the order of about 1 percent by volume.

The wax is removed from the pressed compact by heating the compact up to a temperature of less than 1100° C. to remove the organic binder. For example, the composition is heated to a temperature of several hundred degrees Celsius until the wax or plasticizer material drains from the compact. Preferably, the pressed compact is packed in fine alumina or carbon flour having a finer pore size than that of the pressed compact after wax removal. This enables the wax to be withdrawn by a capillary action induced by the finer pore size packing material. Other suitable packing materials are activated charcoal, high surface area carbon black and activated alumina. The wax, as described heretofore, is almost completely removed from the pressed compact at about 200° C. Subsequent heat treatment is used to sinter the compact or core material to increase its mechanical strength for handling purposes. A typical heating cycle may include a rate of heating at about 25° C. per hour from room temperature up to about 400° C. to remove any wax still present in the compact. Thereafter the heating rate practiced is from about 50° C. per hour to about 100° C. per hour up to a temperature range of from 1100° C. to 1300° C. Between about 900° C. and 1500° C. one may want to heat the compact at a rate of at least 100° C. per hour to prevent excess oxidation of the reactant fugitive filler material. The packed compact is removed from the furnace. Thereafter, the compact is removed from the packing material and the extraneous powder is removed from the outside surfaces by a suitable technique, such as brushing. The core is again placed in the furnace for its high temperature heat treatment. Above about 1300° C., the heating rate is increased until it is greater than about 200° C. per hour and is practiced up to an elevated temperature of about 1650° C. or greater, depending upon the end use of the compact, or core. Upon reaching the elevated temperature, isothermal heating is practiced for a sufficient time for the carbon available to react with the alumina present to produce the desired level of porosity in the fired compact.

An alternate heating or firing schedule entails a partial removal of the wax from the compact by heating the compact at less than 25° C./hr to a temperature of no greater than 200° C. in packing material. The compact is then removed from the packing powder and placed in the sintering furnace. The wax still remaining in the compact gives the compact good handling strength. A heating rate of less than 25° C. per hour is employed up to about 400° C. to remove the remainder of the wax. In order to avoid any oxidation of the reactant fugitive filler material, the subsequent heating rate should be as rapid as possible. The compact is thereafter heated at a rate greater than 200° C. per hour up to 1650° C. or higher depending on the end use of the compact. Upon reaching this predetermined elevated temperature, isothermal heating is practiced for a sufficient time for the reactant fugitive filler material to react with the alumina present to produce the desired level of porosity in the compact.

Any excess carbon in the fired compact is removed by heating the fired compact in an oxidizing atmosphere at a temperature greater than 900° C. Unbound carbon should be removed from the fired compact to prevent possible "boiling" of the cast metal during the practice of solidification of eutectic and superalloy materials.

It is significant to note that when the gases of the controlled atmosphere are completely free of oxygen or water vapor, the heating rate is of little or no importance.

When the fugitive reactant material is either aluminum or boron, the probable chemical reactions between alumina and aluminum and boron, include the following:

$$Al_2O_3 + 4Al \rightarrow 3Al_2O \tag{3}$$

$$Al_2O_3 + Al \rightarrow 3AlO \tag{4}$$

$$Al_2O_3 + 2B \rightarrow Al_2O + 2BO \tag{5}$$

$$Al_2O_3 + B \rightarrow 2AlO + BO \tag{6}$$

To illustrate the capability of either boron or aluminum to function as a reactant fugitive filler material, material compositions of alumina and reactant fugitive filler material were prepared. The molar ratio of reactant fugitive filler material to alumina was 1:2. The material compositions were mechanically mixed and pressed into pellets having a density of about 60% of theoretical. The pellets were then fired in dry hydrogen, dew point −33° F., and heated to an elevated temperature of 1765° C.±20° C. at a rate of 1300° C./hour. The pellets containing aluminum as a reactant fugitive filler material were isothermally heated at temperature for a period of 1 hour. The pellets containing boron as a reactant fugitive material were isothermally heated at temperature for a period of 30 minutes. The pellets were removed from the furnace and cooled to room temperature and then examined.

The pellets having aluminum as a reactant fugitive material registered a weight loss of about 20 percent. The pellet density was about 63 percent of theoretical density. The pellets having boron as a reactant fugitive material registered a weight loss of about 22 percent. The density of the pellets was about 48 percent of theoretical.

The teachings of this invention have been directed towards compacts employed as cores having a complex shape wherein metal cast about the core has a wall thickness of the order of 0.060 inch or less. Therefore, "hot cracking" is critical. When the wall thickness of the cast metal is greater, less porosity is required as the metal has strength to resist the forces exerted by the core. In such instances porosities less than 50 percent by volume can be tolerated. Therefore, compacts for such cores may be prepared with smaller amounts of the reactant fugitive filler. Compacts of simple shapes can be made by simple compaction and subsequent firing following most of the heating sequences described heretofore for compacts including a wax binder. The compact may comprise an alumina bearing flour of the desired particle size range and a reactant fugitive filler to produce the desired porosity content.

We claim as our invention:

1. A method for increasing the porosity and the crushability characteristics of cores and molds for investment casting including the process steps of
   (a) preparing a material composition consisting essentially of an organic binder, a reactant fugitive filler material and an alumina flour which is one selected from the group consisting of alumina, yttrium aluminate, lanthanum alumina, and magnesia doped alumina, the particle size of the alumina flour and the reactant fugitive filler material is less than about 300 microns, and the binder consists of less than 50 percent by volume;
   (b) working a portion of the material composition to produce a preform of a predetermined shape;
   (c) heating the preform in a controlled atmosphere to remove the organic binder from the preform while retaining substantially all of the reactant fugitive filler material therein and to obtain desired green strength, and
   (d) firing the preform in a controlled atmosphere to react the alumina and the reactant fugitive filler material to produce at least one or more suboxides of alumina to produce a ceramic article having a predetermined continuous porosity content, grain morphology, and crushability characteristics.

2. The method of claim 1 wherein
   the preform of the material composition is heated in a controlled atmosphere at a rate of less than 100° C. per hour to a first temperature range of less than about 1100° C. to remove the organic binder,
   the preform is heated in a controlled atmosphere at a rate of at least 100° C. per hour through a first predetermined range of temperature of from about 900° C. to about 1500° C. to prevent excess oxidation of the reactant fugitive filler material,
   the preform is heated in the controlled atmosphere at a rate of greater than 200° C. per hour to a second predetermined temperature range of from about 1650° C. to about 1900° C.,
   the preform is isothermally heated within the second predetermined temperature range for a sufficient time to chemically react substantially all of the reactant filler material with alumina to form suboxides of alumina, and
   vapor transporting at least some of the suboxides of alumina of the fired ceramic article to obtain the desired volume of continuous porosity in the fired ceramic article.

3. The method of claim 2 wherein
   the preform is heated in the second predetermined temperature range in a controlled atmosphere of dry hydrogen.

4. The method of claim 2 wherein
   the preform is heated in the second predetermined temperature range in a controlled atmosphere of wet hydrogen.

5. The method of claim 4 wherein the preform is heated in the second predetermined temperature range in a controlled atmosphere of an inert gas which are selected from the group consisting of argon, helium and neon.

6. The method of claim 2 wherein
   the reactant fugitive filler material is a carbonaceous material.

7. The method of claim 2 wherein
   the reactant fugitive filler material is one selected from the group consisting of aluminum, aluminum carbide, aluminum oxycarbide, boron and boron carbide.

8. The method of either claim 1 or 2 wherein
   heating the preform is at a rate of about 25° C. per hour up to about 400° C.,
   heating the preform at a rate of from about 50° C. per hour to no greater than about 100° C. per hour from about 400° C. up to a temperature range of from 1100° C. to 1300° C.,
   heating the preform at a rate of greater than 200° per hour up to a temperature of about 1650° C. or greater, and
   isothermally heating the preform for a predetermined period of time at the temperature of 1650° C. or greater.

9. The method of claim 8 wherein
   the compact is packed in a fine flour up to about 1100° C. to 1300° C., the flour is one which is selected from the group consisting of alumina, carbon, activated charcoal, high surface area carbon black and activated alumina, the flour having a pore size which is smaller than that of the compact after removal of the binder, and
   removing the compact from the packing flour and continuing the heating.

10. The method of either claim 1 or 2 including the steps of
    packing the compact in a fine flour which is one selected from the group consisting of alumina, activated alumina, carbon, activated charcoal, and high surface area carbon black,
    heating the packed compact at a rate of less than 25° C. per hour up to 200° C. to remove at least a portion of the binder material therefrom,
    removing the compact from the packing flour,
    heating the compact at a rate of less than 25° C. per hour up to 400° C. to remove the remainder of the binder material,
    heating the compact at a rate of greater than 200° C. per hour to at least 1650° C., and
    isothermally heating the compact at the last elevated temperature for a predetermined time period to obtain the desired physical properties.

11. The method of claim 6 wherein
    the carbonaceous material is carbon and the molar ratio of carbon to alumina is from 0.3 to 1.25.

12. The method of claim 11 wherein
    the preferred particle size of the reactant fugitive filler material and the alumina material is from 1 micron to 50 microns.

* * * * *